United States Patent Office 3,025,741
Patented Mar. 20, 1962

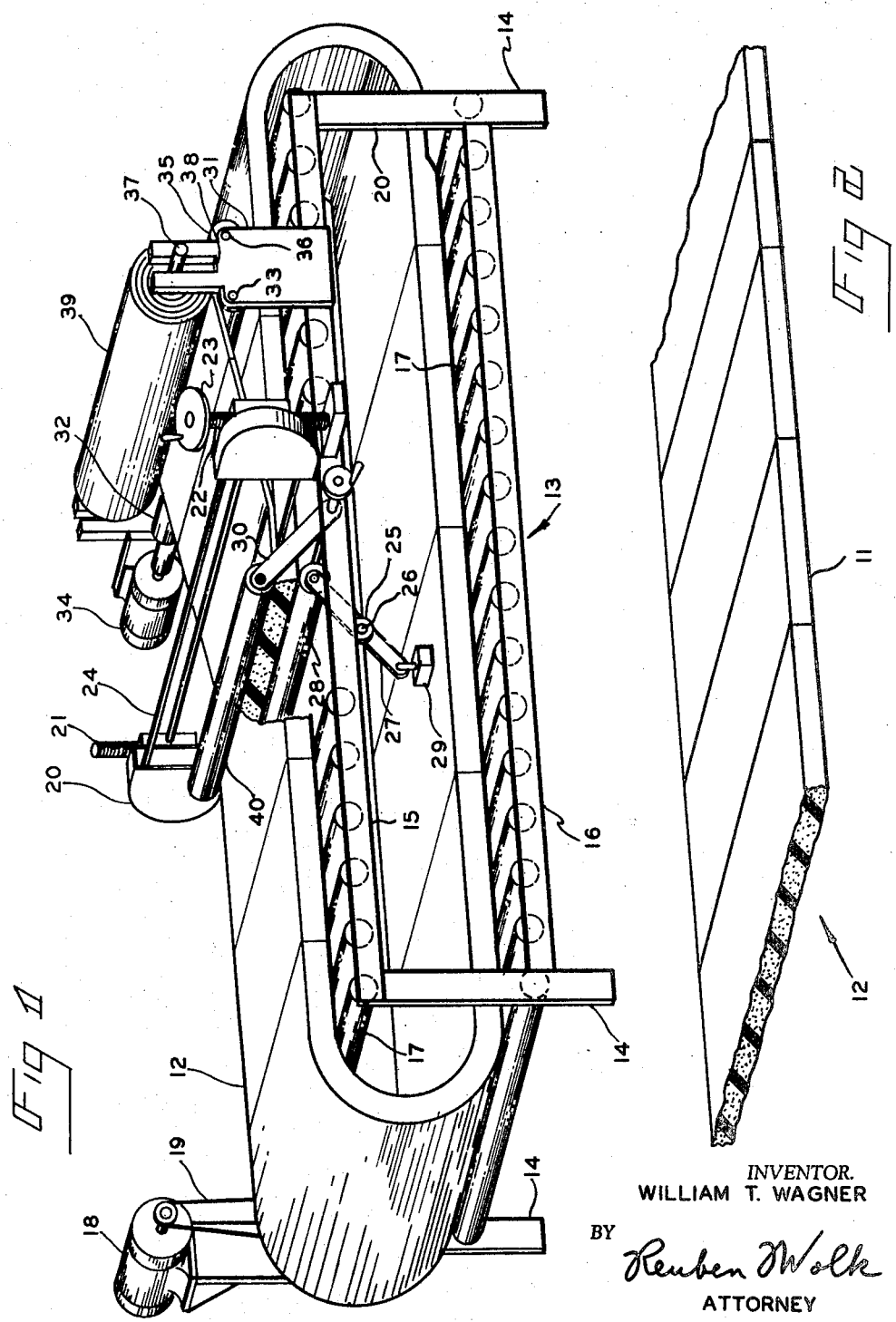

3,025,741
APPARATUS FOR CUTTING SHEET MATERIAL
William T. Wagner, Dayton, Ohio, assignor to Dayco Corporation, a corporation of Ohio
Filed Jan. 24, 1957, Ser. No. 635,993
3 Claims. (Cl. 83—431)

This invention relates to a method and apparatus for producing long continuous webs of sheet material, and more particularly to a method and apparatus for cutting or slicing foam and similar block or sheet molded materials into continuous long thin sheets.

It has been found difficult heretofore to effectively reduce synthetic molded and foamed materials, such as urethane, into webs or sheets of greater extent than the initially formed block product. The conventional practice involves forming the material into blocks or slabs which are then cut into sheets. The size of the slab or block determines the final size of the sheet product. This places a definite limitation on the available sizes of the thin sheet material and correspondingly on the applications to which these sheet products can be efficiently applied.

The present invention enables the manufacturer to efficiently and economically provide continuous rolls of thin sheet urethane or similar foam materials, thus making it feasible to utilize the foam materials in a more efficient manner with a minimum waste of material or effort. Moreover, the provision of long continuous webs of cellular elastomeric materials in roll form permits their use in many fields requiring manipulation of continuous thin web material where protection, comfort, and shock absorption characteristics are of importance.

An object of the invention is to provide a method of forming cellular elastomeric materials into long continuous webs or sheets.

Another object of the invention is to provide an apparatus for forming cellular elastomeric materials into long continuous webs or sheets.

A further object of the invention is to provide a method of forming synthetic foamed materials, such as polyurethane, into large rolls of thin material.

Another object of the invention is to provide means for converting short slabs into large continuous rolls of thin sheets of foamed material.

A further object of the invention is to provide a method and apparatus for producing foam or other materials in thin sheets and continuous lengths possessing the advantageous structural features, the inherent meritorious characteristics, and the mode of operation herein described.

With the above and other objects in view, which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein is illustrated a practical embodiment, but obviously not the only form of the invention:

FIGURE 1 is a perspective view of the apparatus used in the present invention.

FIGURE 2 illustrates the initial formation of an extended strip of foam material in the practice of the invention.

The invention can be best described with reference to the accompanying drawings. In the illustrative embodiment and preferred form, the invention is applied to cellular elastomeric material such as foamed polyurethane. This material, as shown in FIGURE 2, consists of blocks or slabs 11 of foamed polyurethane, fabricated in a well-known manner in accordance with the art. The blocks are formed into an extended strip 12 by joining the relatively short slabs 11 (formed by the usual molding practice) in end to end abutting relation and connecting these ends by suitable adhesive or cement to permanently fasten the sections together into a continuous strip. The nature of the foam material provides substantially instantaneous integration of the slabs.

The apparatus illustrated in FIGURE 1 of the drawings consists of a generally rectangular frame 13. The frame includes vertical legs 14 at the corners interconnected by horizontal members 15 and 16. Mounted transversely of and within the upper and lower members 15 and 16 are conveyor rolls 17 rotatably connected thereto in closely spaced relation from one end to the other. A motor 18 is connected by an endless belt 19 to one of the upper conveyor rolls which in turn drives a lower roll by means of another belt (not shown). By means of further interconnecting belts (not shown), each of the other rolls 17 is driven to provide a conveyor roll system. If desired, conveyor belts may be used in lieu of these rolls.

Fixed to either side of horizontal member 15 intermediate its length, is a cutting or slicing device, such as a horizontally mounted band saw 20. The saw is made vertically adjustable by virtue of its mounting on a pair of vertically extending threaded studs 21 and 22, and a control wheel 23 mounted on the shaft 22. The exact mechanism involved in the adjustment is not a subject of this invention and will not be further detailed, since such mechanism is conventional. A continuous saw blade 24 passes within the holder and is driven by an internally mounted motor (not shown). The adjustability feature will locate the blade at a predetermined position with respect to the rolls 17.

A pair of mounting brackets 25 are fixed to either side of upper member 15 and projects vertically downward therefrom. A pivot shaft 26 supported by brackets 25 passes transversely of the frame below the upper rolls 17, and centrally mounts an arm 27 which has a pressure roller 28 connected to one end and a counterweight 29 connected to its other end. In the upper member 15, slightly in advance of the transversely disposed blade 24, several conveyor rolls 17 are eliminated, leaving a substantial space between adjacent rollers. The arm 27 is so mounted and the counterweight 29 is of the proper weight and balance so that the roller 28 is biased past the space between the conveyor rolls in member 15 in advance of the blade 24.

Fixed to the sides of upper member 15 in transversely aligned relation in advance of blade 24 are brackets 30 which project upwardly from the member and have their extremities disposed immediately in advance of the blade 24. The brackets rotatably support an upper pressure roller 40 in predetermined spaced relation to the upper horizontal member 15 for the purpose to be described below. The pressure roller 40 is so located as to be substantially aligned with the counterbalanced lower pressure roller 28 projecting up through member 15.

Mounted on member 15 are a pair of transversely aligned vertical supports 31, rotatably supporting a drive roller 32 by means of a central shaft 33 driven by a drive motor 34. Also mounted on the supports 31 and adjacent thereto is an idler roller 35, rotatably supported by means of shaft 36. Supported in intermediate relation to the rollers 32 and 35, and also mounted on supports 31, is a take-up roll 37. The roll 37 is supported at its ends in a vertical slot 38 in each support, and acts as a storage reel for the slit sheet material 39.

*Operation*

The method of fabrication and the apparatus used therefor are described as follows. As shown in FIGURE 2, the slab or blocks 11 of polyurethane are joined by cement to form an extended strip 12. This strip 12 is placed over the lower horizontal member 16 on the rolls 17 and looped over the upper horizontal member 15 onto the upper rolls 17. A closing slab member 11 is then cemented between the ends of the strip to form an endless or continuous strip of polyurethane, the major portion of which is supported on the upper rolls 17 as illustrated in FIGURE 1 of the drawings. The band saw 20 is then vertically adjusted by means of control 23 to dispose the blade 24 in a position parallel to upper member 15 to provide a slicing depth relative to the surface of the endless polyurethane strip in accordance with the desired thickness of sheet to be cut therefrom. The upper pressure roller 40 fixed in advance of the cutter blade 24 engages the outer surface of the endless strip to dispose that surface at a predetermined position relative to the blade. The roller 28 is aligned with the fixed upper pressure roller 40 and is biased upwardly beyond the member 15 by means of counterweight 29 to contact the inner surface of the strip and urge the strip against the upper pressure roller. This is to insure a continuous accurate slicing of the strip as it is driven over the upper rollers upon energization of the motor 18. As the layers are cut and peeled off the strip, the continuous bias of the roller 28 will hold the strip against upper pressure roller 40 to maintain the desired depth of cut. It will be recognized that the blade setting as well as the setting of the roller 40 may be adjusted by suitable means in accordance with the original strip thickness and the depth of cut to be taken.

The cut thin sheet 39 is pulled from the blade 24 and passed over the take-up roll 37. The take-up roll is driven by means of drive roller 32 and motor 34 to gradually wind the sliced material into a roll, the material being supported and guided in the process by idler roller 35 as well as the drive roller 32. If desired, other suitable supporting members may be connected to the windup roll supporting members and frame 15 to stabilize the members 31 and accommodate an adjustment of the guide rolls as the spool of thin gage material increases in diameter.

Thus, the method and apparatus of the invention produces foam material in thin, long continuous strips in a simple, economical fashion. The result will substantially widen the field of application of foam materials and improve end products accordingly.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

I claim:

1. Apparatus for forming a continuous strip of short thick slabs of cemented foam material into continuous thin webs of sheet material including a frame consisting of vertical members and horizontal members therebetween, conveyor rolls mounted on the upper and lower surfaces of said horizontal members continuously advancing and supporting said strip, a cutting blade moving at right angles to a direction of travel of said strip in a plane parallel thereto and mounted above said conveyor rolls in predetermined spaced relation to the peripheral surface of said strip, means for energizing said conveyor means to advance said strip relative to said blade, and means immediately in advance of said blade continuously biasing said strip outwardly relative to said conveyor means to maintain its outer surface in continuous predetermined spaced relation to said conveyor means whereby a uniform thin gage sheet material may be formed from the cemented slabs of foam material.

2. The structure as set forth in claim 1 including an upper pressure roller mounted above and in predetermined spaced relation to said rolls, and biasing means mounted below and in relatively aligned relation to said rolls biased to maintain the inner surface of the strip in contacting relation to said upper pressure roller.

3. The structure as set forth in claim 2 wherein said biasing means consists of a pivotally mounted arm having a lower pressure roller mounted on one end and vertically aligned with said upper pressure roller and a counterweight mounted on the other end of said arm for biasing said lower pressure roller toward said strip.

References Cited in the file of this patent

UNITED STATES PATENTS

| | | |
|---|---|---|
| 267,990 | Firman | Nov. 21, 1882 |
| 584,683 | Griffith | June 15, 1897 |
| 1,189,724 | Neal | July 4, 1916 |
| 1,584,312 | McManus | May 11, 1926 |
| 1,731,132 | Hendry et al. | Oct. 8, 1929 |
| 1,832,424 | Rau | Nov. 17, 1931 |
| 2,163,372 | Claxton et al. | June 20, 1939 |
| 2,214,461 | Hendry | Sept. 10, 1940 |
| 2,785,739 | McGregor et al. | Mar. 19, 1957 |
| 2,805,700 | Klasing et al. | Sept. 10, 1957 |
| 2,841,205 | Bird | July 1, 1958 |
| 2,878,868 | Brandt et al. | Mar. 24, 1959 |

FOREIGN PATENTS

| | | |
|---|---|---|
| 460,067 | Great Britain | Jan. 20, 1937 |
| 537,250 | Great Britain | June 13, 1941 |